United States Patent
Teerink et al.

(10) Patent No.: US 9,659,025 B1
(45) Date of Patent: May 23, 2017

(54) AUTOMATION OF RSG MANAGEMENT FOR BACKUP AND RECOVERY

(71) Applicant: EMC CORPORATION, Hopkinton, MA (US)

(72) Inventors: Scott C. Teerink, Mukilteo, WA (US); Girish L. Nayak, Bellevue, WA (US); Dianne C. Thompson, Bellevue, WA (US)

(73) Assignee: EMC IP HOLDING COMPANY LLC, Hopkinton, MA (US)

( * ) Notice: Subject to any disclaimer, the term of this patent is extended or adjusted under 35 U.S.C. 154(b) by 206 days.

(21) Appl. No.: 13/801,178

(22) Filed: Mar. 13, 2013

(51) Int. Cl.
*G06F 17/30* (2006.01)

(52) U.S. Cl.
CPC .............................. *G06F 17/30117* (2013.01)

(58) Field of Classification Search
None
See application file for complete search history.

(56) References Cited

U.S. PATENT DOCUMENTS

| | | | |
|---|---|---|---|
| 7,676,689 B1 * | 3/2010 | Shioyama et al. ............ | 714/6.12 |
| 8,032,725 B1 * | 10/2011 | Malinowski .......... | G06F 11/004 711/162 |

OTHER PUBLICATIONS

"Exchange Server 2007", Microsoft, 2007, TechNet Library, pp. 1-12.*

* cited by examiner

*Primary Examiner* — Hung Q Pham
(74) *Attorney, Agent, or Firm* — Workman Nydegger

(57) ABSTRACT

In one example, a process for recovery management in a server environment includes creating a recovery database on the server, mounting the recovery database to a volume on the server, setting an overwrite flag for the recovery database, dismounting a previously existing recovery database from the volume, and deleting the previously existing recovery database. One, some, or all of the aforementioned processes may be performed automatically without requiring specific user inputs or commands.

21 Claims, 17 Drawing Sheets

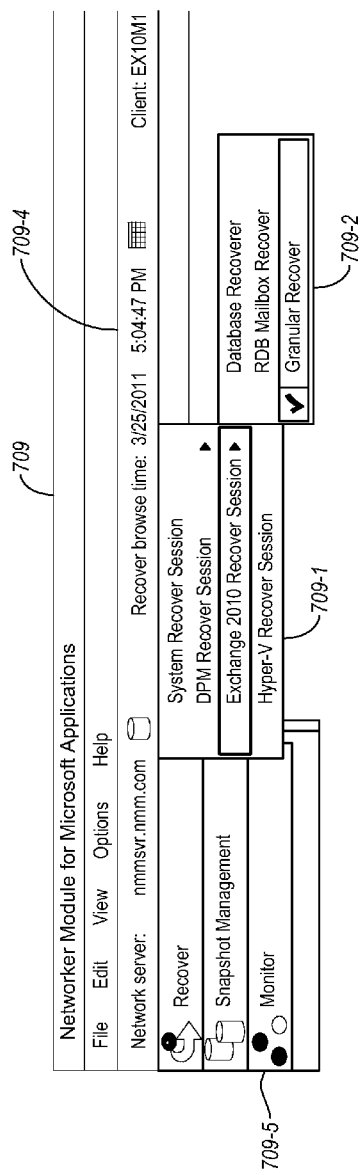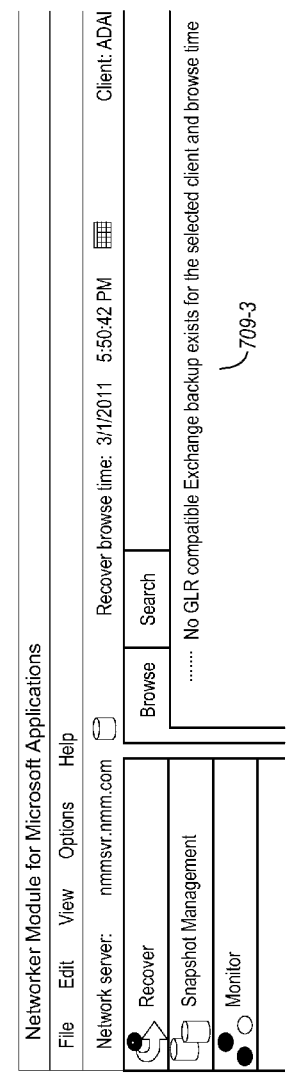
FIG. 7a
FIG. 7b

AUTOMATION OF RSG MANAGEMENT FOR BACKUP AND RECOVERY

FIELD OF THE INVENTION

Embodiments of the present invention generally concern backup and recovery of data. More particularly, some embodiments of the invention concern systems and methods for automated management of aspects of data backup and/or recovery processes.

BACKGROUND

Enterprises and other entities may generate and collect a variety of different types of data, at least some of which may be critical to the operation of the enterprise. Such data may include, and/or be embodied in, financial information, business records, electronic mail, attachments to electronic mail, medical records, and personnel records, to name a few examples.

The unrecoverable loss of such data may be a matter of great concern for the enterprise. For example, the loss of business data and financial information may harm the competitive position or advantage of the enterprise. As another example, the loss of email and email attachments could expose the enterprise to legal or other liability. Moreover, insofar as email and email strings can provide a useful record and documentation of communications, decisions, and agreements, for example, the loss of such email could be problematic for the enterprise.

In view of the need to be able to reliably backup and recover important data, a variety of systems and methods have been devised which allow critical data to be backed up so that in the event that such a loss or compromise occurs, the data can be recovered. However, the vast amount of data generated and collected by enterprises has complicated backup and recovery efforts. One particular problem is that backup and recovery efforts typically require human intervention at various points during those processes.

However, human intervention increases the chances that an error will be introduced into the process, and the requirement for human intervention also means that the backup and/or recovery processes may not proceed as quickly as desired. This latter point may be of particular concern in situations where large amounts of data are required to be backed up and recovered and/or where the relatively quick backup and recovery of data is important to the enterprise.

Another aspect of the requirement for human intervention that is problematic is the fact that some backup and/or recovery processes, such as those that may be used for email, are based upon the assumption that the user has knowledge of certain prerequisites to those processes. That is, the user must have a certain level of knowledge in order that the backup and recovery processes can be executed. A user who lacks such knowledge cannot perform the required actions and, thus, cannot ensure execution of the backup and recovery processes.

As the foregoing suggest, conventional systems and processes may complicate and slow down the backup and recovery of data, while also increasing the likelihood of problems occurring during those processes. Thus, it would be useful for enterprises to have a way to speed up data backup and recovery, while also reducing the risk of problems occurring during those processes and freeing human resources for other tasks.

BRIEF DESCRIPTION OF THE DRAWINGS

The appended drawings contain figures of example embodiments to further illustrate and clarify various aspects of the present invention. It will be appreciated that these drawings depict only example embodiments of the invention and are not intended to limit its scope in any way. Aspects of the invention will be described and explained with additional specificity and detail through the use of the accompanying drawings in which:

FIGS. 7a-7i are example dialog boxes and UIs that may be presented to a user in connection with the recovery processes of FIGS. 5 and 6.

DETAILED DESCRIPTION OF SOME EXAMPLE EMBODIMENTS

Figure 1:
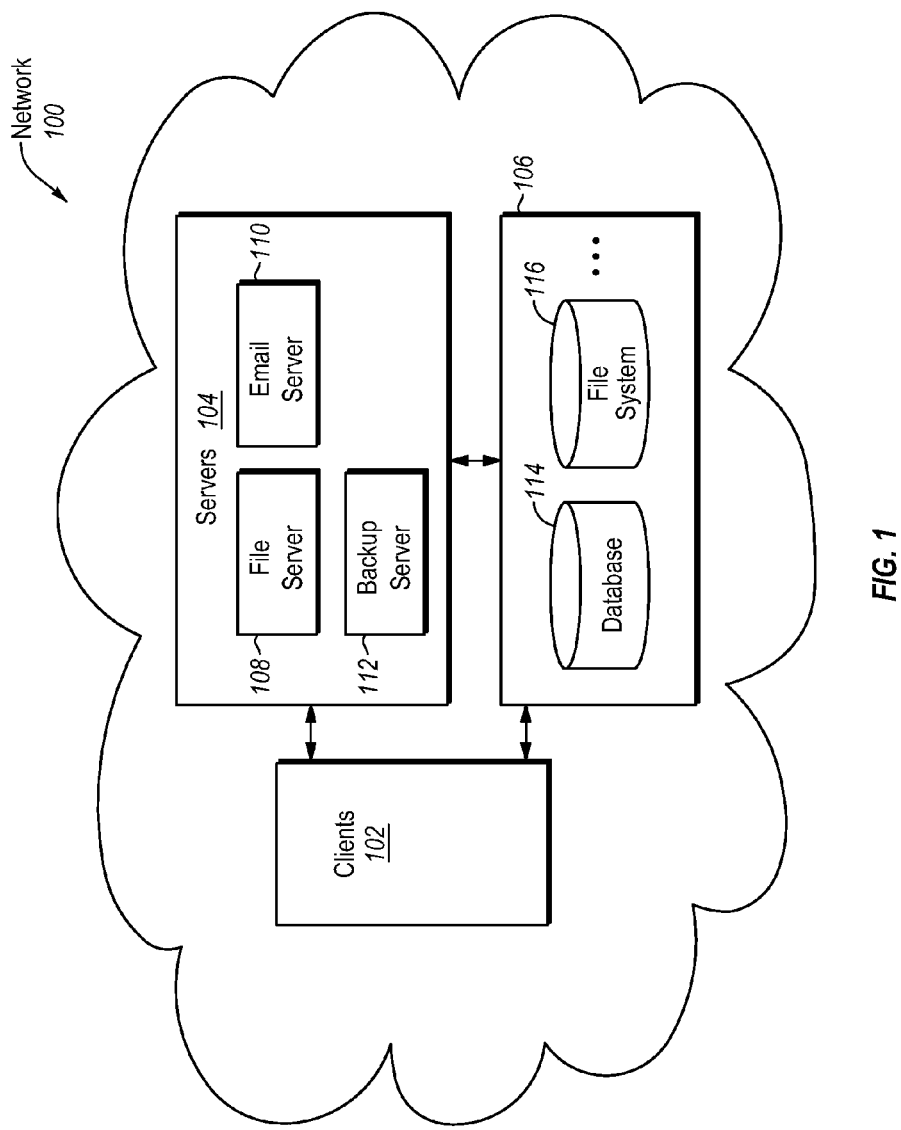
FIG. 1 is a diagram that discloses aspects of an example network environment.

Embodiments of the present invention generally concern backup and recovery of data. More particularly, some embodiments of the invention concern systems and methods for automated management of aspects of data backup and/or recovery processes. Among other things, such automation may enable an enterprise to speed up data backup and recovery, while also reducing the risk of problems occurring during those processes. As well, another benefit of automation is that valuable human resources are freed for tasks better suited to human involvement.

A. Data Backup and Recovery

Data backup and recovery systems and processes enable an entity such as an enterprise to manage, backup, recover, access, and use, various types of data. To the extent that improvements in such data backup and recovery systems and processes can be structured and implemented which reduce the need for human involvement and intervention, such improved systems and processes may be advantageous relative to more conventional approaches.

At least some embodiments of the invention are concerned with automation of aspects of a data backup and recovery process. In some instances, the data backup and recovery processes relate to enterprise email systems. However, the scope of the invention is not limited to email related systems and processes, nor to any particular implementation, revision, or version of an email system or process.

In the particular example of enterprise email systems, at least some embodiments of the invention involve the automation of the management of a Recovery Storage Group (RSG), or a Recovery DataBase (RDB). For example, after a backup has been made of an MS Exchange database, it may be desirable to recover one or more of any of the following objects, such as a mailbox(es), folders, calendars, tasks, contacts, or even individual message(s), from that backup of the MS Exchange database.

In order to recover one or more such objects, an RSG or RDB, depending upon the version of MS Exchange, must be created to receive a backup of the database. Once the RSG or RDB has been created, the RSG or RDB must then be mounted, that is, made available for use in the remainder of the recovery process. To ensure that the restored backup is directed to the newly created RSG or RDB, any existing RSG or RDB is deleted prior to recovery of any objects, as discussed in more detail below.

At this point, the backup that was restored to the RSG or RDB can be browsed by a user, and an object or objects of interest can then be recovered from that backup to the RSG or RDB, without necessitating recovery of the entire backup. The restored object(s) can then copied from the new RSG or RDB to a desired destination, such as a production mailbox for example. As part of restoration and/or recovery, any existing RSG or RDB, as applicable, can be dismounted, thus ensuring that no objects for the current recovery process are directed to the previously existing RSG or RDB. The previously existing RSG or RDB can then be deleted, and the newly created RSG or RDB may be deleted as part of a subsequent restoration and/or recovery process.

In accordance with at least some example embodiments of the invention, management of the aforementioned processes from creation of the RSG/RDB through deletion of the RSG/RDG may be performed automatically with little, or no, human intervention or involvement. Such automated processes, and their associated systems, may be particularly useful insofar as the automated processes can eliminate the need for a user to interact with a user interface (UI) to effect recovery of one or more objects. As another example, such automation may eliminate the need for tracking of the states of an RSG or RDB, since an RSG or RDB associated with a prior recovery process may be automatically detected and deleted before the next recovery process is performed.

B. General Aspects of Some Software Environments

Following is a discussion of general aspects of some example operating environments in conjunction with which embodiments of the invention may operate. While example embodiments disclosed herein may be described as operating in connection with one or more of such operating environments, those operating environments are presented solely by way of example and are not intended to limit the scope of the invention in any way.

Briefly, embodiments of the invention may be employed in connection with a variety of environments, one example of which includes a network environment, which could be a wide area network (WAN), local area network (LAN, the Internet, or any combination of the foregoing. While embodiments of the invention are well suited for use in Internet Protocol Version 4 (IPV4) networks, the scope of the invention is not limited to that, or any other, particular protocol. To illustrate, at least some embodiments of the invention are compatible with other protocols, such as the Internet Protocol Version 6 (IPV6).

Whatever its particular form or configuration, the network may include software and systems that perform and/or direct backup and recovery services. Such backup and recovery services may, but need not, involve a variety of recovery processes, one example of which is granular level recovery (GLR). In brief, GLR permits the recovery of objects on an object-by-object basis, if desired, from a recovered database backup, without necessitating recovery of the entire database. Thus, in certain circumstances, GLR may be more focused in its operation and, therefore, faster than systems and methods that require recovery of an entire database in order to gain access to a particular object or group of objects that are of interest.

Recovery processes such as GLR can be performed in connection with applications where it is desirable to be able to recover, from a database backup, a single object, groups of objects, or some number of objects less than all of the objects stored in the backup. One example of such an application is MS Exchange. When employed in an MS Exchange environment, for example, a GLR process can enable recovery of objects on an object-by-object basis, if desired, from a backup of a database. More generally however, the level of granularity for a recovery process can be defined as desired.

Thus, for example, objects recoverable by a GLR process from a backup of an MS Exchange server database may include a mailbox, folder, or individual email message, task, contact, or calendar. In the foregoing, and other environments, recoverable objects may additionally, or alternatively, include directories, sub-directories, and files. As well, GLR processes can be compatible with any number of versions of an application. To continue with the foregoing illustration concerning the MS Exchange environment, a GLR process may be useful in MS Exchange 2007 and/or MS Exchange 2010, for example. In connection with the foregoing reference to different versions of MS Exchange, it should be noted that in the specific context of MS Exchange 2007, a backup of an Exchange server database may be referred to herein as a storage group, such as is discussed in more detail below in connection with FIGS. 5-5*h*, for example. Generically however, a storage group is a collection of databases that share a group of transaction logs. For Exchange 2007, NMM can perform a backup of one storage group at a time.

Finally, and as discussed in more detail below, recovery processes such as GLR processes can be performed by a variety of different mechanisms and modules. To illustrate, at least some GLR processes can be performed in whole or in part by a plug-in module that interfaces with another application. In the particular example of the MS Exchange environment, GLR processes may be performed by an MS Exchange plug-in module for MS Exchange 2007 and/or MS Exchange 2010. In particular, these modules performing GLR processes may operate as plug-ins to a client such as the NMM client discussed below.

C. General Aspects of a Network Environment

FIG. 1 illustrates an example of a network environment in which at least some embodiments of the invention may be employed. In this example, the system 100 represents a network such as a local area network, a wide area network, and the like or any combination thereof. The connections in the network 100 can be wired and/or wireless. In this case, the network 100 typically includes clients 102 that have access to various servers 104 and to data 106. Various services are typically provided by the servers 104 and, in some embodiments, access to some or all of the data 106 is controlled by the various servers 104. Some of the data 106, such as backed up data for example, is not necessarily available to the clients 102.

Examples of the servers 104 may include a file server 108, an email server 110, a backup server 112, or any combination thereof. Each of the servers 104 resides in or is accessible over the network 100, and the servers 104 may or may not be co-located. The data 106 may include, among other things, a database 114 and file storage 116. The file storage 116 and database can be implemented in various ways using different software, different configurations, and the like.

One of skill in the art can appreciate that one or more of the clients 102, servers 104, data 106, file servers 108, email servers 110, backup servers 112, databases 114, and file storage 116 can be connected in a wide variety of configurations using various types of connections. To illustrate, backup server 112 may be implemented as a network server from which database backups can be initiated. Further, the software that operates on the servers 104, clients 102, and on the data 106 in some instances, may have certain properties or configurations, as discussed in more detail below. One example of such software is MS Exchange.

D. Example Environment for Data Recovery

Figure 2:
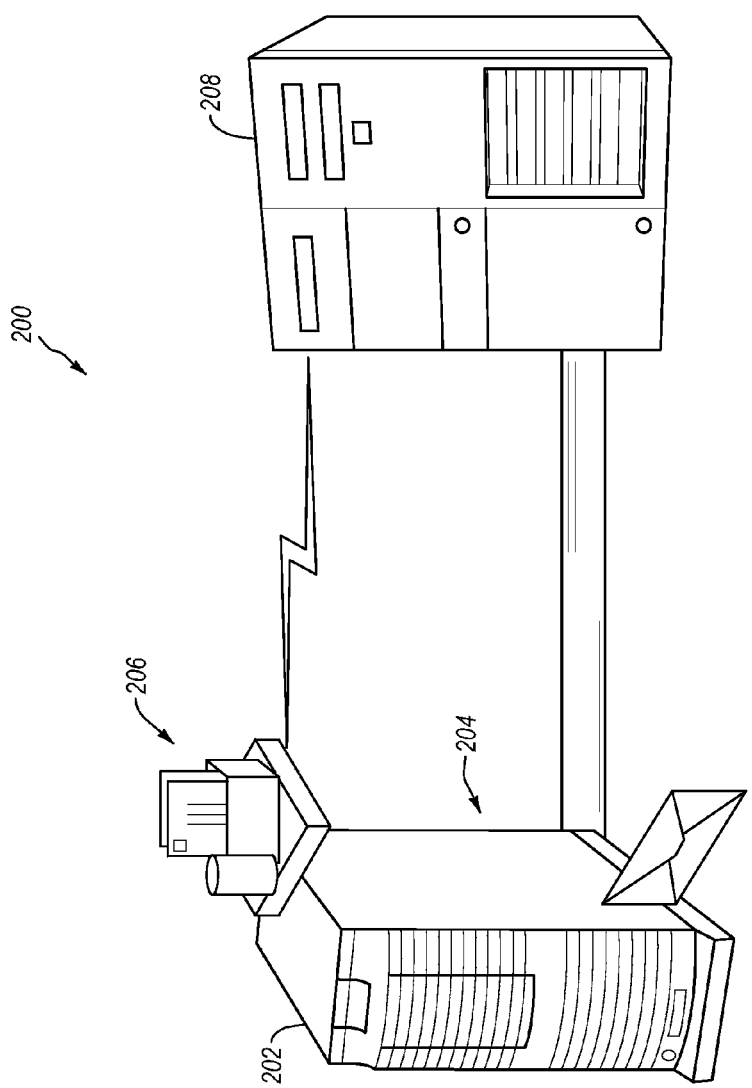
FIG. 2 is a diagram that discloses aspects of an example environment for data recovery.

Direction attention now to FIG. 2, details are provided concerning aspects of one example environment in which data management, which can include data backup and recovery, may be performed.

In the example of FIG. 2, the system 200, which may be the same as or similar to system 100, includes an email server 202 such as an MS Exchange server, for example. In the particular circumstance where the email server 202 is an MS Exchange server, the email server 202 may be compatible with one or the other of MS Exchange 2007 and MS Exchange 2010, and the email server 202 may be running the Network Module for Microsoft (NMM) client. Various versions of NMM, such as NMM v2.4 for example, can be used, although the use of NMM is not required in every embodiment. As explained in more detail below, NMM supports GLR for both MS Exchange 2007 and MS Exchange 2010.

With continued reference to FIG. 2, the email server 202, particularly where it is running NMM for GLR operations, supports the creation and use of created-for-the-purpose RSGs and RDBs, depending upon the version of MS Exchange that is in use. That is, RSGs may be created and used in the MS Exchange 2007 environment, while RDBs may be created and used in the MS Exchange 2010 environment.

Briefly, and as described in more detail below, when a recovery process is performed, a virtual volume 204 is created on the email server 202 and a database backup having one or more objects 206 and stored on network server 208, discussed below, can be restored to an RSG or RDB created on the virtual volume 204. The RSG can then be browsed by a user and selected objects 206 from the database backup, which could be an MS Exchange database backup, can be recovered. Thus, an RSG generally refers to a recovery storage group created, such as by the Exchange plug-in module discussed above, to enable management of a recovery database that stores, for example, mailbox content. Improvements to the RSG concept have resulted in the development of the RDB, which is a recovery database that is created, for example, by the Exchange plug-in module discussed above, and is able to receive backups without necessitating implementation or use of the management layer of the RSG.

As noted above, the system 200 further includes a network server 208 which may have any of a variety of configurations, examples of which include a Microsoft Windows® configuration, or a UNIX® configuration. In general, backups of the email server 202, or one or more portions thereof, may be initiated at the network server 208. Moreover, in at least some instances, a backup of the email server 202 resides on the network server 208. Alternatively, the network server 208 may be in communication with a remote database, that is, located remotely from the network server 208, where a backup of the email server 202 may reside. Regardless of its location, the backup of the email server 202 may or may not be GLR-compatible. However, where the network server 208 is Networker File System (NWFS)-compatible, that is, NWFS is installed on network server 208; the network server 208 may store a backup of the email server 202 that is GLR-compatible. Such a backup may be a full backup that includes a GLR index.

E. Example Process for Data Backup and Recovery

Figure 3:
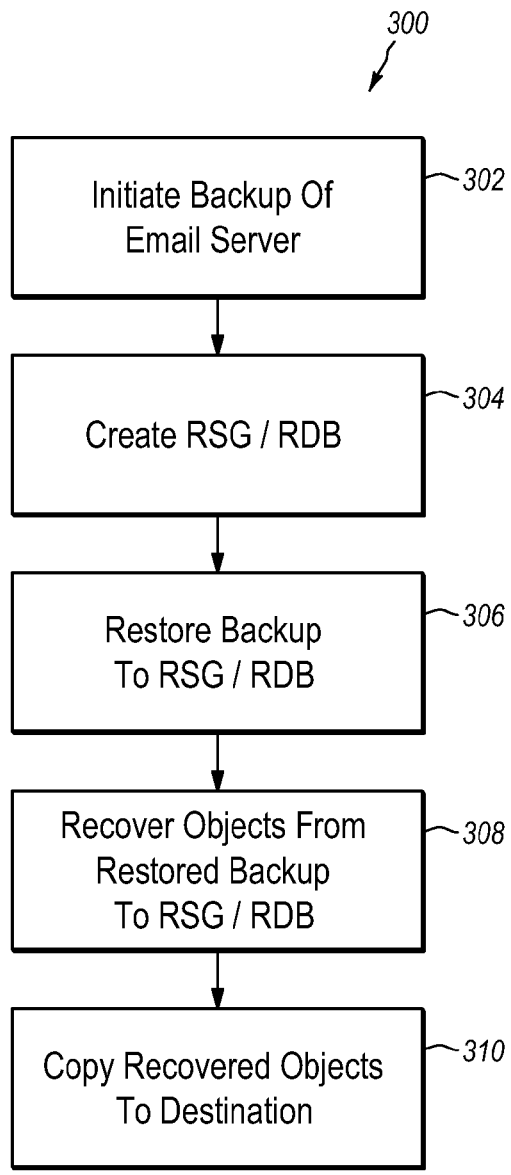
FIG. 3 is a flow chart that discloses basic aspects of a backup and recovery process performed in connection with a server, such as an email server.

Directing attention now to FIG. 3, details are provided concerning a process 300 for backing up a database, and recovering objects from the restored backup. The process may be performed in connection with an email server, or any other server or device which is to be backed up. Accordingly, while the specific example of FIG. 3 refers to an email server, the scope of the invention is not so limited.

The example process 300 begins at 302 where backup of a server, such as an email server 110 for example, is initiated. Initiation of the backup may occur, for example, at a network server such as network server 208. If NWFS is installed on the network server, the backup process initiated at 302 may result in the creation of a GLR-compatible backup of the email server. This backup can be a full backup that includes a GLR index. Once the backup is created, it may be stored at the server, or on a database accessible by the server.

After creation of the backup, and in the case where the backed up server is an email server, an RSG or RDB is created 304 at the server that was previously backed up at 302. As explained earlier, the creation of an RSG or RDB may depend upon which version of MS Exchange is involved in the backup and recovery process. Moreover, the creation, use and deletion of an RSG or RDB may be partly or completely automated. Further details concerning example processes for creation and management of RSGs and RDBs are provided elsewhere herein.

Once the RSG or RDB, as applicable, has been created, a user can select a particular backup and restore 306 that backup to the RSG or RDB. The user can then browse the RSG or RDB and recover 308 desired objects from the restored backup into the RSG or RDB. Where the process 300 involves a GLR employed in an email environment, one or more objects such as a mailbox, folder, calendar, task, contact, or even individual message, or combinations of any of the foregoing, can be recovered into the RSG or RDB.

When the desired object, or objects, have been recovered, such as into the RSG or RDB for example, those objects can then be copied 310 to one or more desired locations. To illustrate, in the case where process 300 is performed in an email environment, an object copied from the RSG or RDB may comprise an individual email message copied into a mailbox of a user. Thus, when the user opens an appropriate email program, such as Outlook® for example, the user will see the recovered message in his email box.

F. Example Processes for RSG Management

As noted earlier, embodiments of the invention embrace, among other things, automated RSG and RDB management. While the automated management of an RSG and/or RDB may be performed in connection with a GLR process, for example, such automated management may be performed in connection with alternative recovery processes, and is not limited to use solely with GLR processes. Thus, to the extent that automated management of an RSG and/or RDB is discussed below, or elsewhere herein, in connection with a GLR process, it should be understood that such discussion is provided solely by way of example, and is not intended to limit the scope of the invention in any way.

Figure 4:
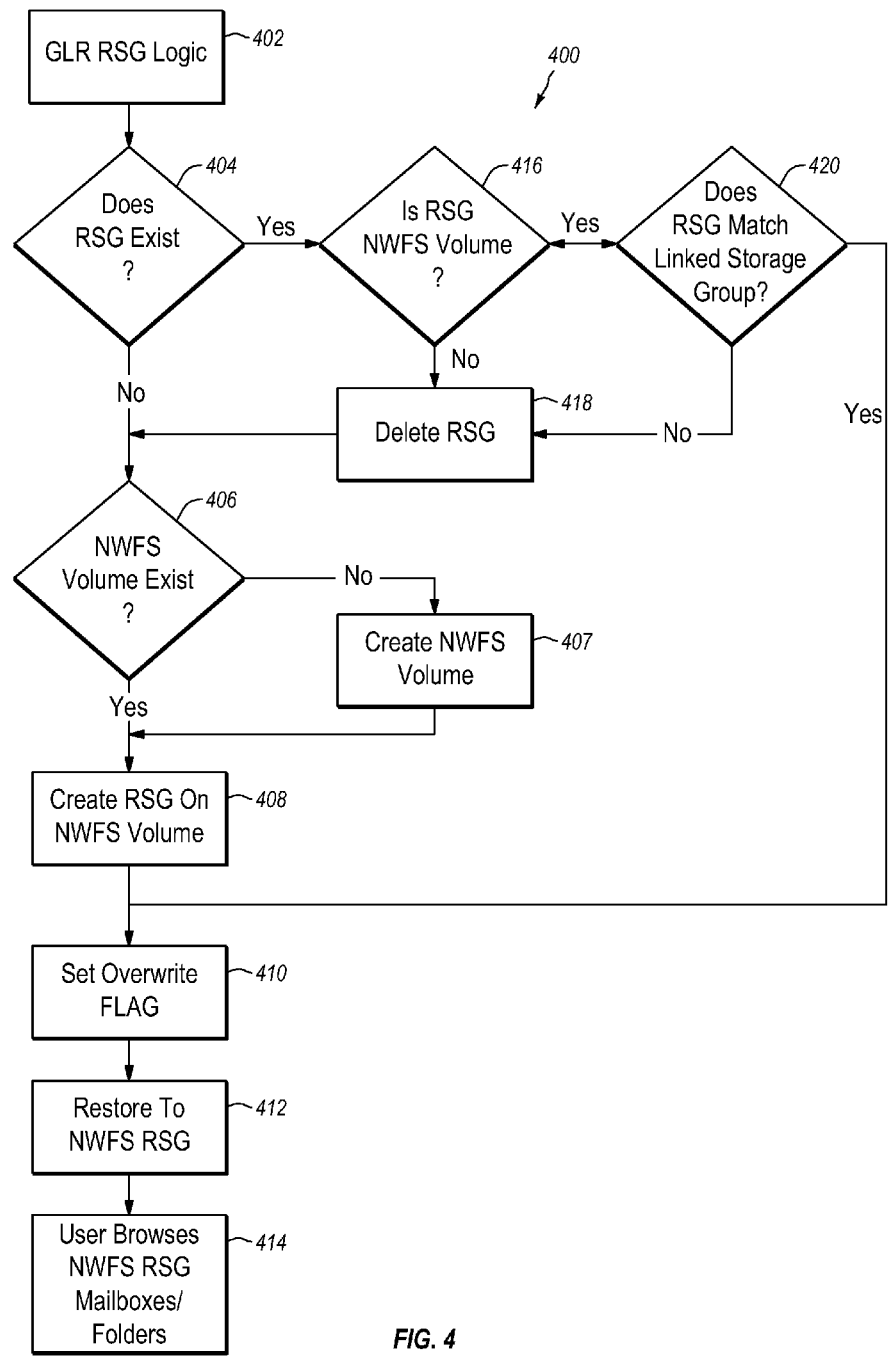
FIG. 4 is a flow chart that discloses aspects of a recovery process that includes automated RSG management.

With attention first to the flow chart of FIG. 4, details are provided concerning aspects of a process 400 for automated RSG management, such as may be employed in connection with MS Exchange 2007. In brief, at least some embodiments of the process 400 clean up any pre-existing GLR resources from previous recoveries, and also create new GLR resources for the current recovery process.

For the purposes of the discussion of FIG. 4, the process 400 may be performed in whole or in part by a GLR plug-in to MS Exchange. The architecture associated with the process 400 may include, for example, an email server 202 (FIG. 2), such as an MS Exchange server that is NWFS-compatible, and is running the NMM client. The RSG management logic 402 defines the process 400.

Initially, the email server is queried 404 to determine if an RSG exists. Such an RSG, if it exists, may have been created in connection with a previous recovery process. If no RSG exists, the process 400 advances and the email server is queried 406 to determine if an NWFS volume exists. As noted earlier, an NWFS volume may be a virtual volume, created on the email server, on which an RSG can be created. It should be noted that, in some cases at least, an NWFS volume is not persistent across reboots. Thus, if a user shut down the email server after the prior recovery process, it may be discovered at 406 that no NWFS volume exists.

If it is determined that an NWFS volume does not exist, an NWFS volume is created 407. On the other hand, if an NWFS volume already exists on the email server, an RSG for recovery of objects from a backup is created 408 on the existing NWFS volume. Creation of the RSG may also involve mounting the RSG, that is, making the RSG available for use. After the RSG is created and mounted, an overwrite flag is set 410 for the RSG so that the RSG will be automatically deleted as part of a recovery process that occurs subsequent to process 400. After the overwrite flag has been set, a selected backup is restored 412 to the RSG. As part of the restoration and/or recovery processes, any previously existing RSGs may be automatically deleted.

A user can then browse 414 the RSG to identify particular objects desired to be recovered from the backup that was recovered to the RSG. While not specifically shown in FIG. 4, the RSG can be dismounted, and then deleted, once the user has recovered the desired object(s). Further, the RSG will be deleted if the display is closed. In some embodiments at least, the RSG is not dismounted and deleted until a subsequent recovery and/or restoration process has commenced.

In connection with the foregoing discussion, at least some of the elements of the process 400 can be performed automatically, that is, without specific user input or commands. Thus, in example embodiments, one, some, or all of the following processes may all be performed automatically, in any suitable order: creation of a new RSG; mounting of the new RSG; setting the overwrite flag for the new RSG; dismounting a previously existing RSG; and, deleting the previously existing RSG. As noted elsewhere herein, automation of these processes eliminates the need for a user to initiate these processes and also eliminates the need for a corresponding UI. The aforementioned automatically performed processes may be performed, for example, by a GLR plug-in to MS Exchange, although that is not necessary.

Moreover, one, some, or all of the aforementioned processes can be automatically triggered by other events in the process 400. To illustrate, when it has been determined 406 that an NWFS volume exists, that determination may trigger the automatic creation and mounting of the RSG, as well as the setting of the overwrite flag. As well, and discussed in more detail in connection with FIG. 5, when a user closes the UI for object recovery from the restored database, dismounting and deletion of any existing RSG may occur automatically in response. The aforementioned triggering processes are provided by way of example and additional, or alternative, triggers may be used to cause automatic performance of one or more of creation of a new RSG, mounting of the new RSG, setting the overwrite flag for the new RSG, dismounting an existing RSG, and deleting the existing RSG.

Returning now to the query 404, the process 400 may proceed differently than described above if it is determined 404, in connection with a recovery process, that an RSG already exists. If an RSG is determined 404 to exist, a further query 416 is performed to determine whether that RSG resides in an NWFS volume. If the answer to that query is negative, the RSG in the NWFS volume is deleted 418 and the process returns to 406, described above. It should be noted that in some embodiments at least, only a single RSG can exist on the initiating server, that is, the server running NMM, at any one time.

On the other hand, if the answer to the query 416 is affirmative, a further query 420 is performed to determine if the existing RSG in the NWFS volume matches a linked storage group. If the answer to query 420 is affirmative, the process 400 returns to 410 as described above. However, if the answer to query 420 is negative, the RSG is deleted, and the process 400 returns to 406, as described above.

Figure 5:
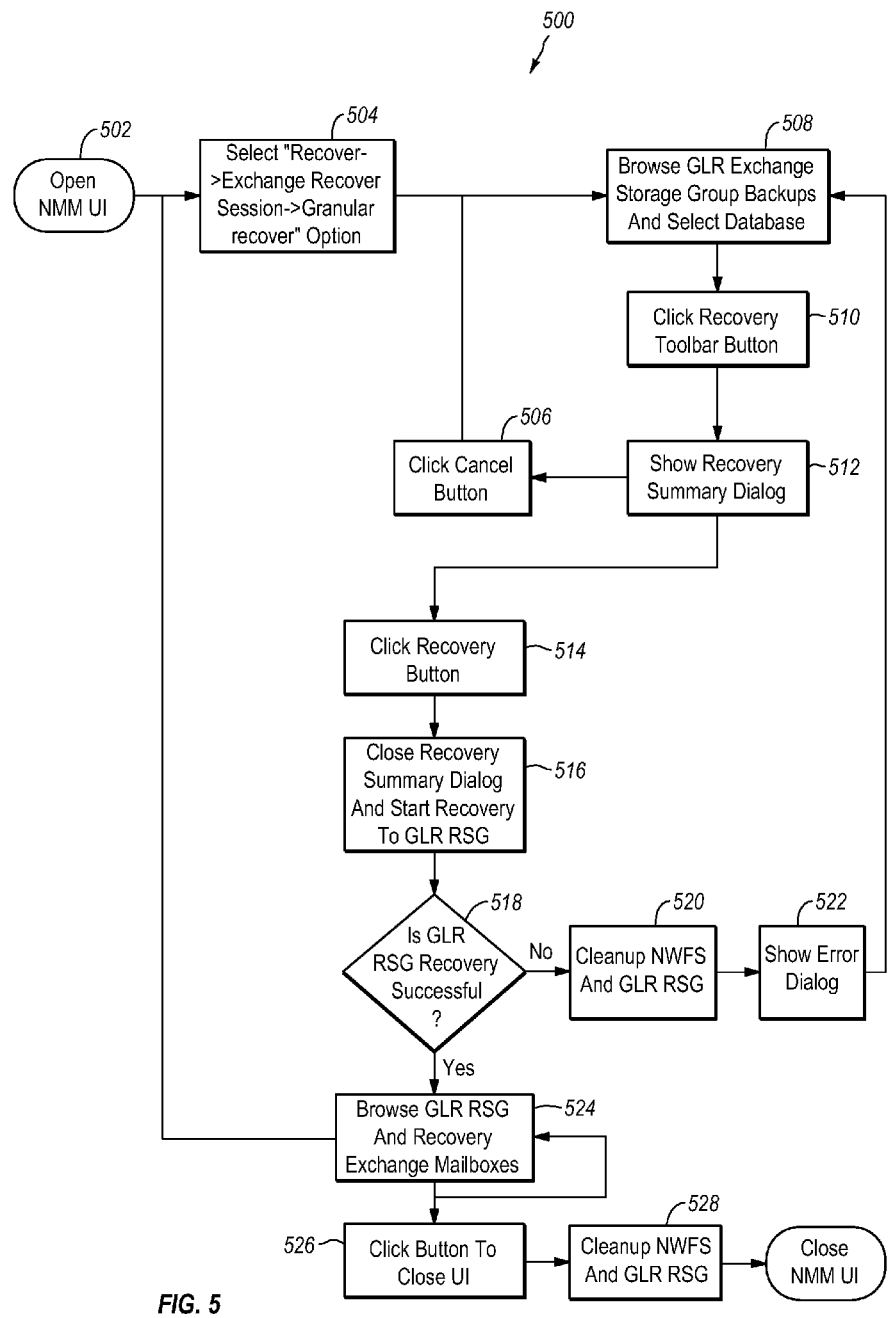
FIG. 5 is a workflow diagram disclosing an example implementation of the recovery process disclosed in FIG. 4.
Figure 5A:
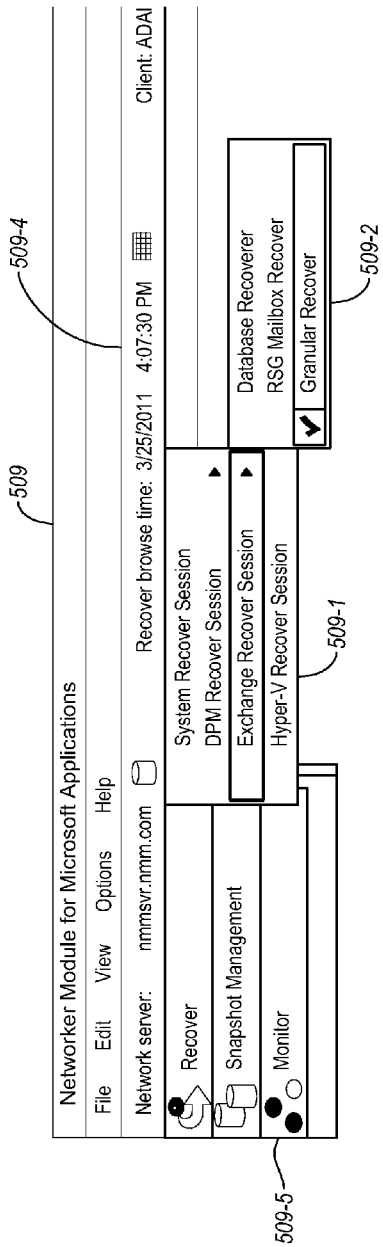
FIGS. 5a-5h are example dialog boxes and UIs that may be presented to a user in connection with the recovery processes of FIGS. 4 and 5.
Figure 5B:
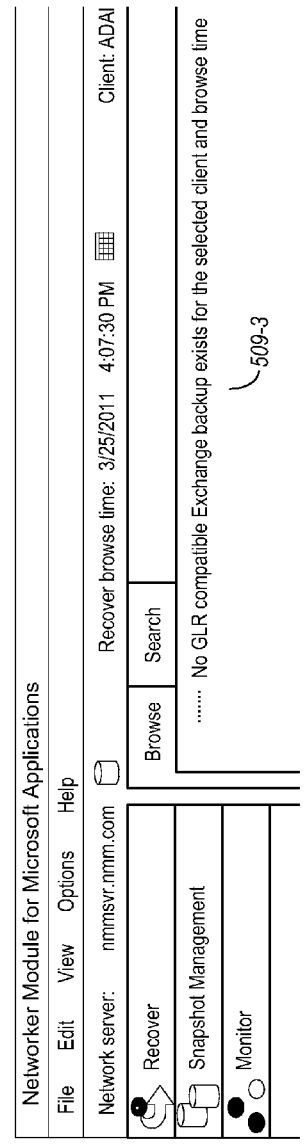
Figure 5C:
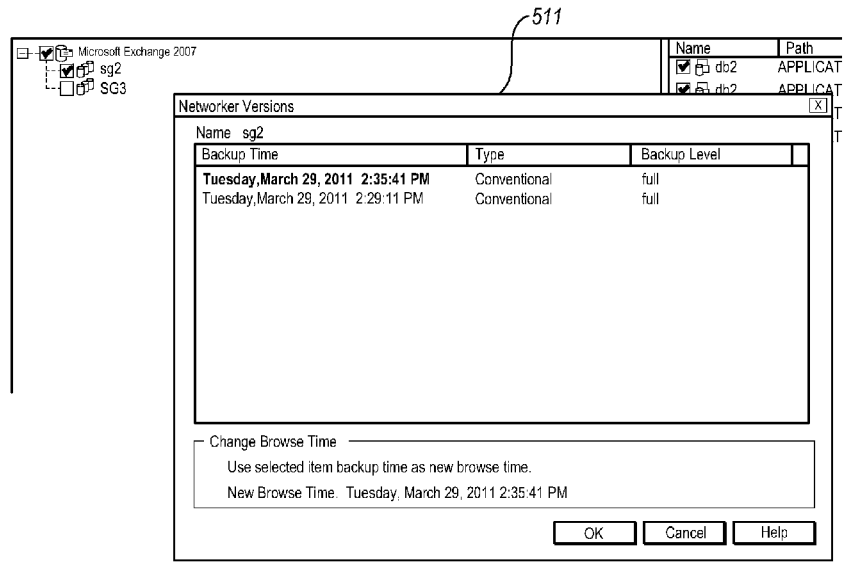
Figure 5D:
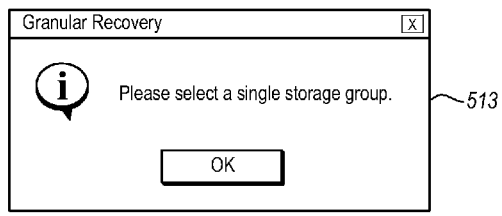
Figure 5E:
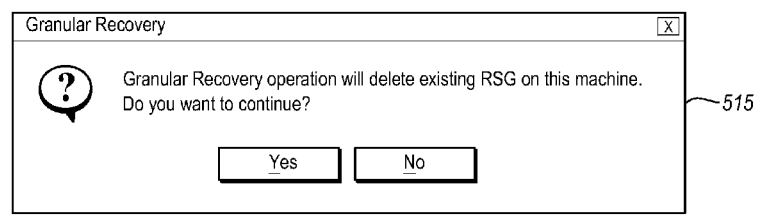
Figure 5F:
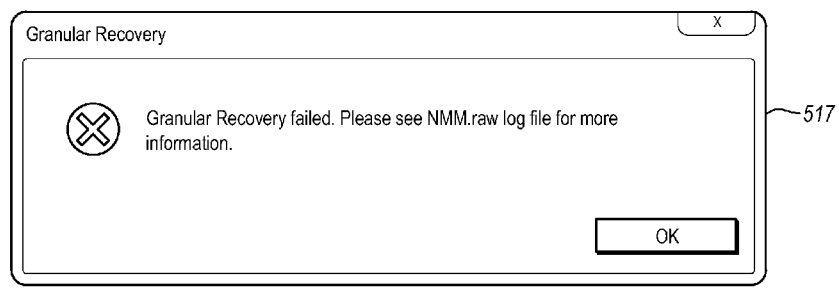
Figure 5G:
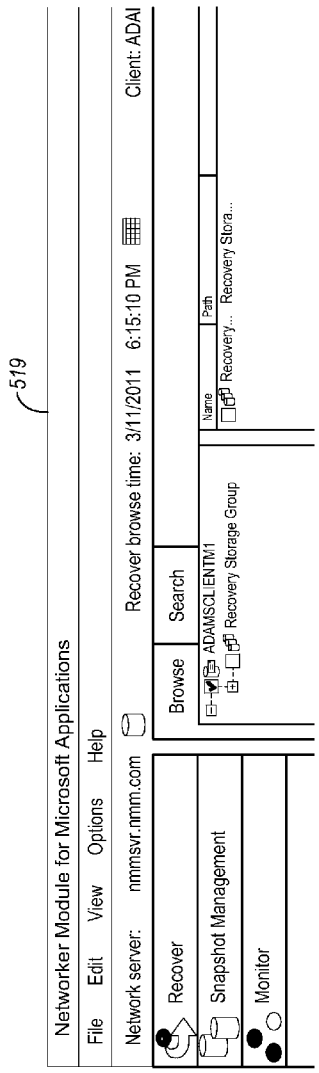
Figure 5H:
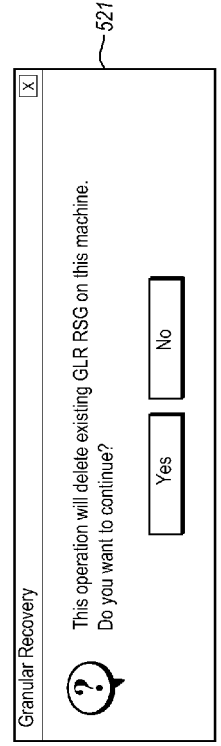

Turning now to FIGS. 5 through 5h, details are provided concerning an example workflow for a recovery process 500 that uses an RSG such as was established by the process 400. The recovery process 500 may be a GLR process and may be performed in connection with a system or systems such as system 100 and/or system 200, described above. As discussed in more detail below, the process 500 may include some management of one or more RSGs, including deleting the newly created RSG if a recovery process proves unsuccessful, and/or deleting an existing RSG prior to, or in conjunction with, performance of a recovery and/or restoration process. As noted in the discussion of FIG. 4, the deletion of an RSG is one example of an RSG management process that can be performed automatically without specific user input or commands. Finally, some or all of the process 500 may be performed by a GLR plug-in to MS Exchange, such as MS Exchange 2007.

The process 500 may begin when a user opens 502 an NMM UI for an NMM which may be running on a server such as server 202 (FIG. 2). From that UI, the user can choose to perform a granular recovery 504 in an MS Exchange recover session. As indicated at 506, the user may choose to cancel the process 500 if desired. If the process 500 is not canceled however, the user may browse 508 a list of storage group backups, which may be GLR-compatible storage group backups such as GLR Exchange storage group backups, and then select a database for restoration.

Aspects of an example of a UI 509 that may be employed in connection with the aforementioned browsing and selection processes are set forth at FIGS. 5a and 5b. In particular, the UI 509 may permit a user to select a particular type of session 509-1, such as an Exchange recover session, and then further specify a particular type of recovery process 509-2, such as a granular recovery process. Where process 500 is a GLR process, a dialog 509-3 as shown in FIG. 5b may be employed to signal to a user a circumstance where there are no GLR-compatible backups to recover. As further suggested in FIG. 5a, a user can select a different browse time 509-4 to see if there are any GLR-compatible backups available to recover. As well, the user can select the 'Recover' button 509-5, which will cause the display of all storage groups, or backups, for a particular client and time, regardless of whether those storage groups are GLR-compatible or not. With reference to FIG. 5c, some storage groups may have more than one version, and a UI 511 may be provided that enables a user to select a particular version for restoration. Moreover, and as indicated in the dialog 513 of FIG. 5d, some embodiments provide that only one storage group can be selected for restoration at a With continued reference now to FIG. 5, once the user has selected a storage group for restoration, a user can initiate 510 the recovery process, such as by clicking or selecting a 'Recovery' button on a toolbar (not shown). If the recovery process fails, a dialog (not shown) may be displayed 512, indicating the failure to a user. At that point, the user may choose to cancel 506 the recovery process. On the other hand, if no problems are encountered, a UI 515 such as shown in FIG. 5e may be displayed 512, notifying the user that if the user should choose to proceed with the recovery process, any existing RSG will be deleted. If the user selects the 'No' option in UI 517, the user may choose to cancel 506 the recovery process.

As noted elsewhere herein, deletion of any existing RSG may occur automatically when triggered by selection 514 of the 'Yes' option in UI 515 by the user. Once the user has elected to continue with the recovery process, UI 515 closes, and creation of an RSG begins automatically. An example process for creation of an RSG is disclosed in FIG. 4. As noted elsewhere herein, some or all of the process in FIG. 4 may be performed automatically without the need for UIs, or specific user inputs or commands.

After creation of the RSG, recovery 516 of the selected storage group to the RSG begins. It should be noted that creation of the RSG may take place at any time prior to 516. Alternatively, creation of the RSG can be performed in conjunction with 516. In any case, a query 518 is made as to whether or not the selected storage group was successfully recovered to the RSG. If not, the NWFS and RSG may be automatically deleted 520, and a corresponding error message, such as message 517 in FIG. 5f, communicated 522 to the user. At this point, the process 500 may return to 508.

If, on the other hand, the query 518 reveals that recovery of the selected storage group to the RSG was successful, a UI such as the UI 519 of FIG. 5g is displayed which enables the user to review and select 524 one or more objects from the recovered storage group for restoration. If the user indicates that those objects are to be restored to the RSG that was created, a UI 521 such as is shown in FIG. 5h will be displayed, prompting the user to confirm that restoration of those objects to the new RSG will cause any existing RSG to be deleted, automatically in at least some embodiments. In particular, after the user has closed 526 any previously existing RSG managed by NMM is deleted 528, and the NMM UI closed, ending process 500.

G. Example Processes for RDB Management

Figure 6:
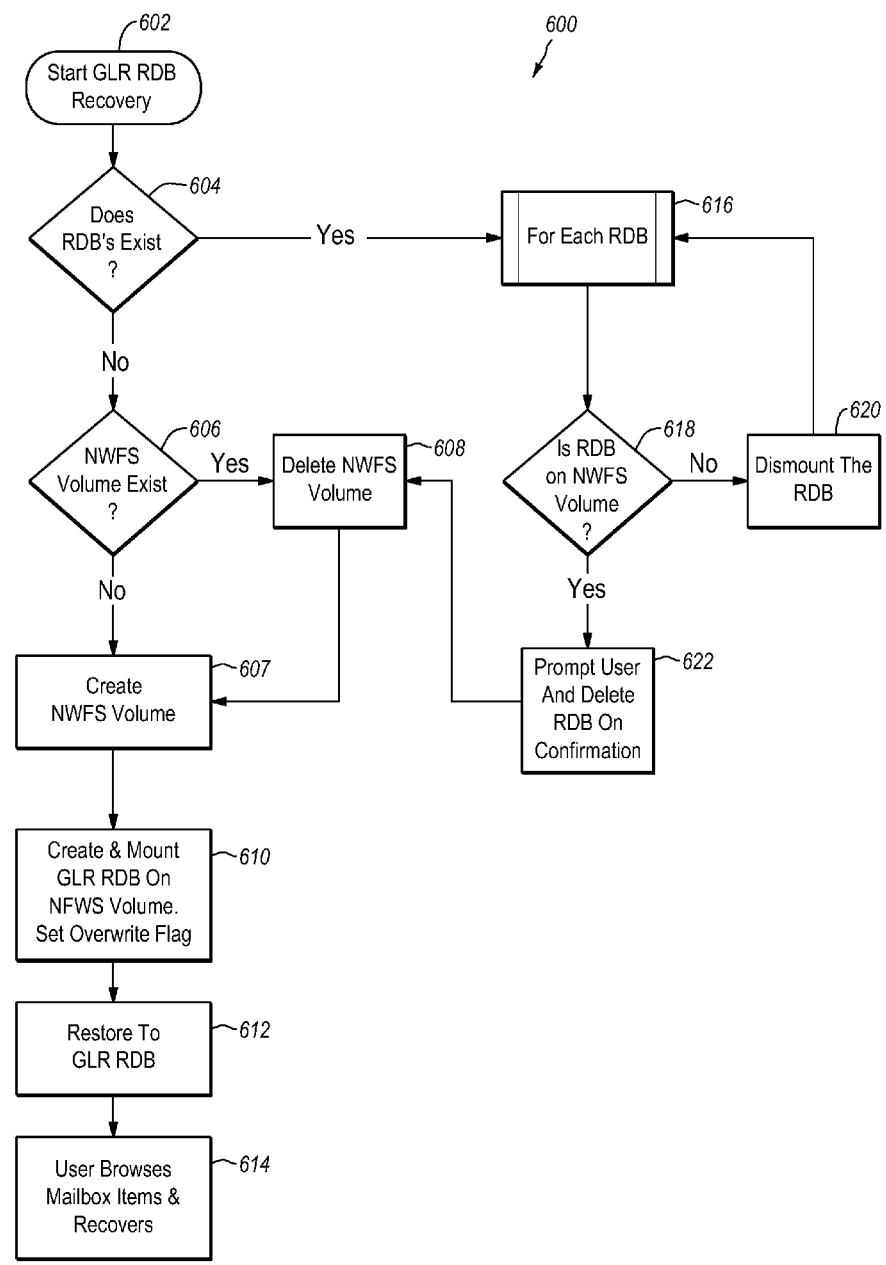
FIG. 6 is a flow chart that discloses aspects of a recovery process that includes automated RDB management.

With attention first to the flow chart of FIG. 6, details are provided concerning aspects of a process 600 for automated RDB management, such as may be employed in connection with MS Exchange 2010. In brief, at least some embodiments of the process 600 clean up any pre-existing GLR resources from previous recoveries, and also create new GLR resources for the current recovery process.

For the purposes of the discussion of FIG. 6, the process 600 may be performed in whole or in part by a NMM GLR plug-in for MS Exchange. The architecture associated with the process 600 may include, for example, an email server 202 (FIG. 2), such as an MS Exchange server that is NWFS-compatible, and is running the NMM client. Except as noted below, the process 600 may be substantially the same as process 400.

The process 600 for RDB management begins at 602 and the email server is queried 604 to determine if an RDB exists. Such an RDB, if it exists, may have been created in connection with a previous recovery process. If no RDB exists, the process 600 advances and the email server is queried 606 to determine if an NWFS volume exists. As noted earlier, an NWFS volume may be a virtual volume, created on the email server, on which an RDB can be created. It should be noted that in some cases at least, an NWFS volume is not persistent across reboots. Thus, if a user shut down the email server after the prior recovery process, it may be discovered at 606 that no NWFS volume exists.

If it is determined that an NWFS volume does not exist, an NWFS volume is created 607. On the other hand, if an NWFS volume already exists on the email server, the existing NWFS volume is deleted 608, and the process 600 moves to 607. After creation of the new NWFS, an RDB for recovery of objects from a backup is created 610 and mounted on the new NWFS volume. After the RDB is created and mounted, an overwrite flag is set 610 for the RDB so that the RDB will be automatically deleted in connection with the performance of another recovery process subsequent to process 600.

After the overwrite flag has been set, a selected backup is restored 612 to the RDB. As part of the restoration and/or recovery processes, any previously existing RDBs may be automatically deleted. Once the backup is restored to the RDB, a user can then browse 614 the RDB to identify particular objects desired to be recovered from the backup that was restored to the RDB. While not specifically shown in FIG. 6, the RDB can be dismounted, and then deleted, once the user has restored the desired object(s). In some embodiments at least, the RDB is not dismounted and deleted until a subsequent recovery and/or restoration process has commenced.

In connection with the foregoing discussion, at least some of the elements of the process 600 can be performed automatically, that is, without specific user input or commands. Thus, in example embodiments, one, some, or all of the following processes may all be performed automatically, in any suitable order: creation of a new RDB; mounting of the new RDB; setting the overwrite flag for the new RDB; dismounting a previously existing RDB; and, deleting the previously existing RDB. As noted elsewhere herein, automation of these processes eliminates the need for a user to initiate these processes and also eliminates the need for a corresponding UI. The aforementioned automatically performed processes may be performed, for example, by a GLR plug-in to MS Exchange, although that is not necessary.

Moreover, one, some, or all of the aforementioned processes can be automatically triggered by other events in the process 600. To illustrate, when the new NWFS volume is created 607, that creation may trigger the automatic creation and mounting of the RDB, as well as the setting of the overwrite flag. As well, and discussed in more detail in connection with FIG. 7, when a user closes the UI for object recovery from the restored database, dismounting and deletion of any existing RDBs managed by NMM may occur automatically in response. The aforementioned triggering processes are provided by way of example and additional, or alternative, triggers may be used to cause automatic performance of one or more of the following including creation of a new RDB, mounting of the new RDB, setting the overwrite flag for the new RDB, dismounting an existing RDB, and deleting the existing RDB.

Returning now to the query 604, the process 600 may proceed differently than described above if it is determined 604, in connection with a recovery process, that one or more RDB already exists. If an RDB is determined 604 to exist, a further process 616 is performed for each existing RDB. In particular, a query of the email server is made 618 to determine whether the existing RDB resides on an NWFS volume. If the answer to the query is negative, the RDB is dismounted 620 from that NWFS volume, and the process returns to 616.

On the other hand, if the answer to the query 618 is positive, the user is prompted 622 to confirm and delete the RDB. The process 600 may then return to 608 where the NWFS volume associated with the deleted RDB is, itself, deleted.

Figure 7:
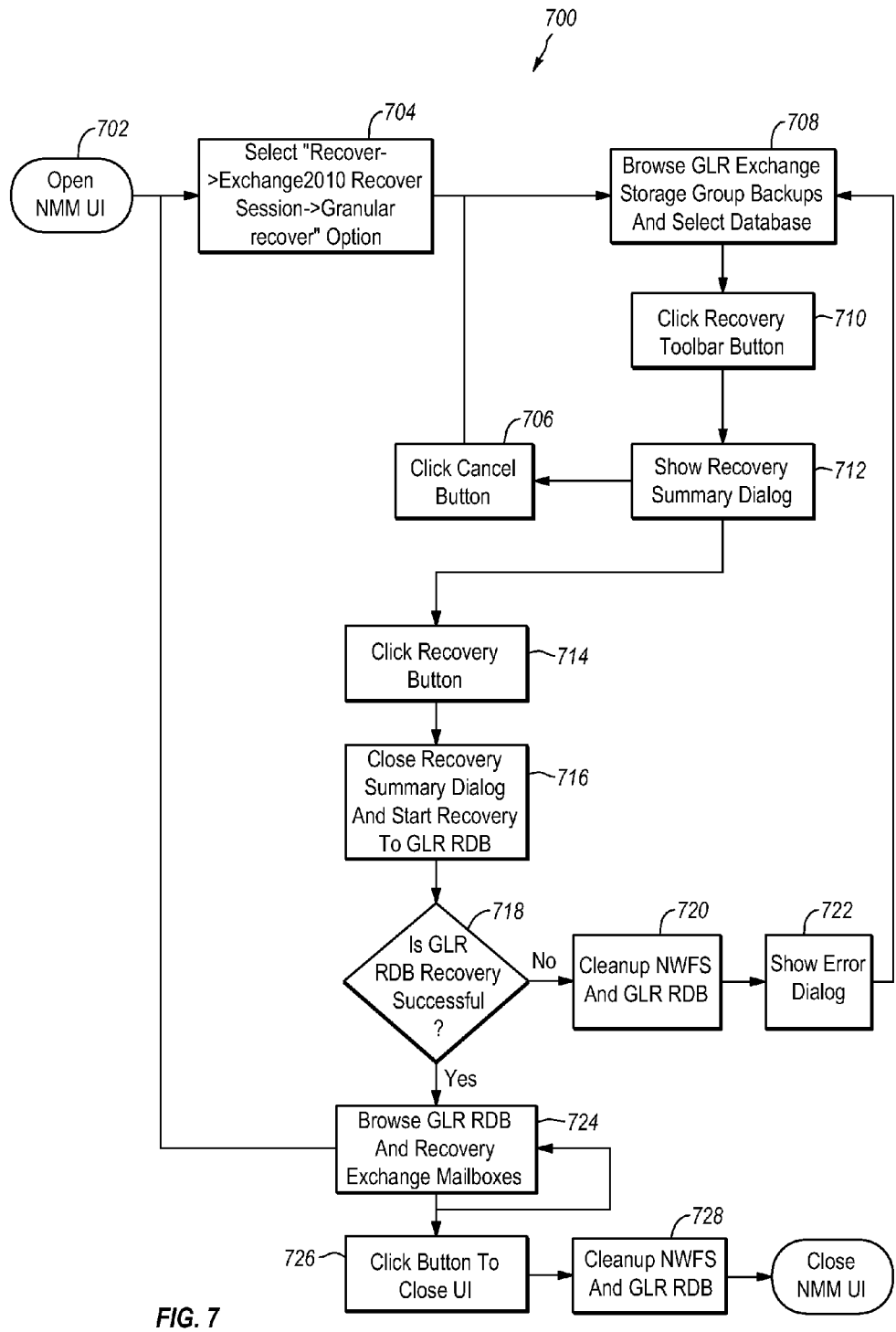
FIG. 7 is a workflow diagram disclosing an example implementation of the recovery process disclosed in FIG. 6.
Figure 7C:
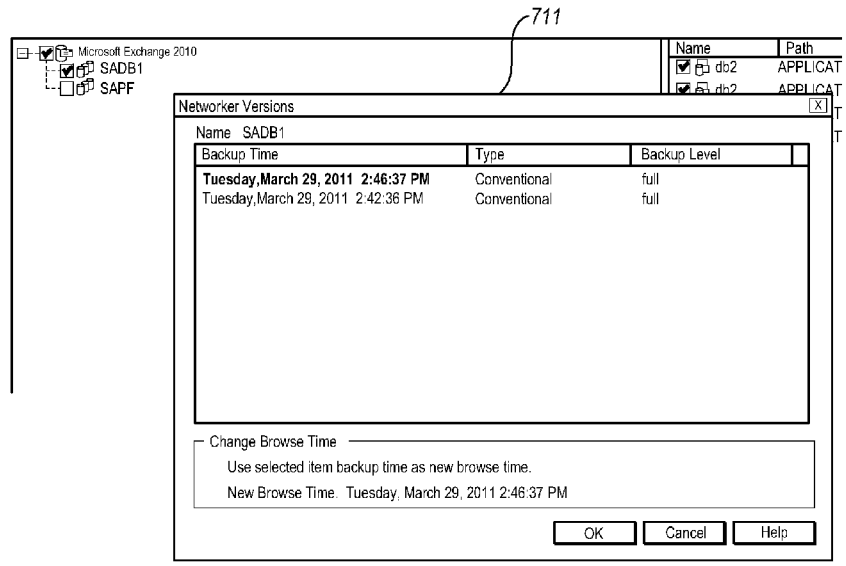
Figure 7D:
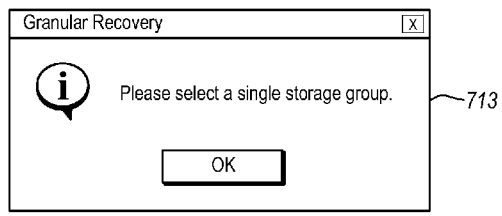
Figure 7E:
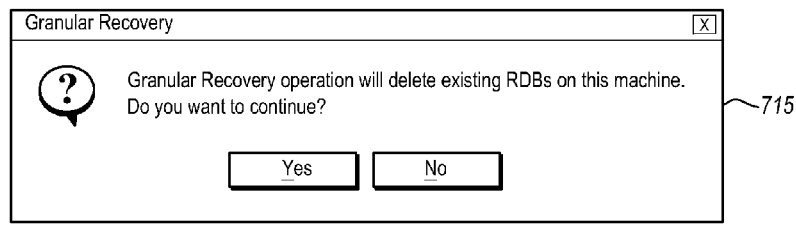
Figure 7F:
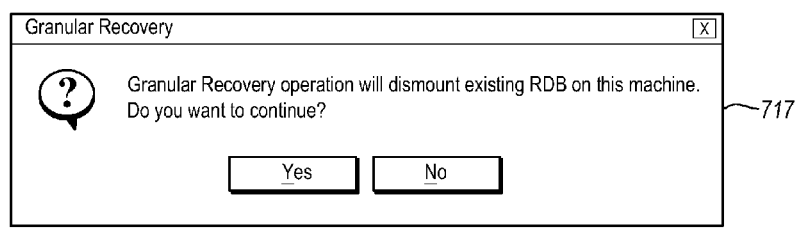
Figure 7G:
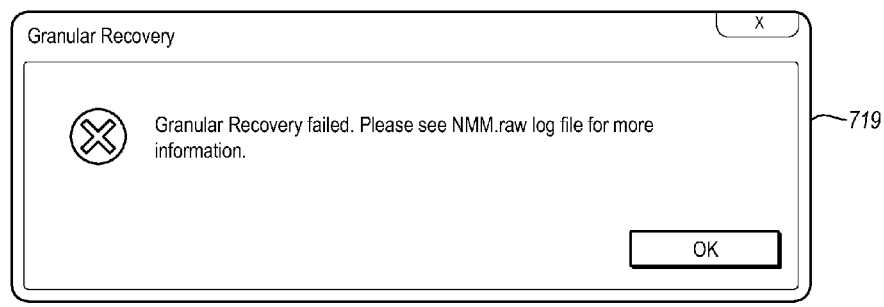
Figure 7H:
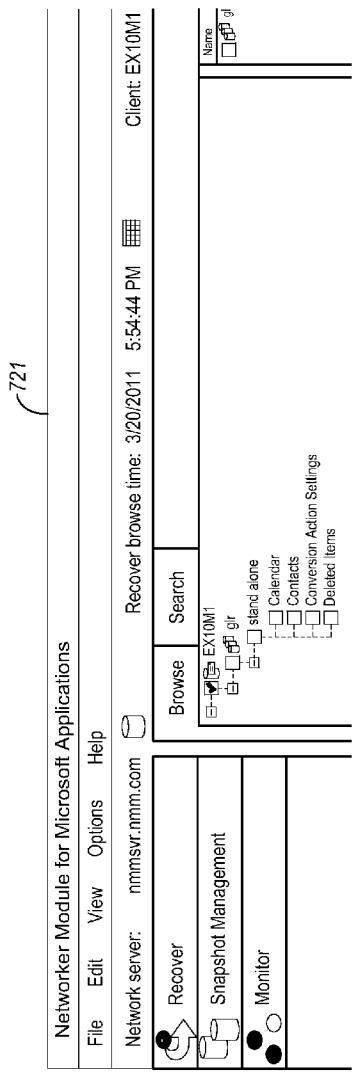

Turning now to FIGS. 7 through 7h, details are provided concerning an example workflow for a recovery process 700 that uses an RDB such as was established by the process 600. The recovery process 700 may be a GLR process and may be performed in connection with a system or systems such as system 100 and/or system 200, described above. As discussed in more detail below, the process 700 may include some management of one or more RDBs, including deleting the newly created RDB if a recovery process proves unsuccessful, and/or deleting an existing RDB prior to, or in conjunction with, performance of a recovery and/or restoration process. As noted in the discussion of FIG. 6, the deletion of an RDB is one example of an RDB management process that can be performed automatically without specific user input or commands. Finally, some or all of the process 700 may be performed by a NMM GLR plug-in for MS Exchange, such as MS Exchange 2010.

The process 700 may begin when a user opens 702 an NMM UI for an NMM which may be running on a server such as server 202 (FIG. 2). From that UI, the user can choose to perform a granular recovery 704 in an MS Exchange recover session. As indicated at 706, the user may choose to cancel the process 700 if desired. If the process 700 is not canceled however, the user may browse 708 a list of storage group backups, which may be GLR-compatible database backups such as GLR Exchange storage group backups, and then select a database for restoration.

Aspects of an example of a UI 709 that may be employed in connection with the aforementioned browsing and selection processes are set forth at FIGS. 7a and 7b. In particular, the UI 709 may permit a user to select a particular type of session 709-1, such as an Exchange recover session, and then further specify a particular type of recovery process 709-2, such as a granular recovery process. Where process 700 is a GLR process, a dialog 709-3 as shown in FIG. 7b may be employed to signal to a user a circumstance where there are no GLR-compatible backups to recover. As further suggested in FIG. 7a, a user can select a different browse time 709-4 to see if there are any GLR-compatible backups available to recover. As well, the user can select the 'Recover' button 709-5, which will cause the display of all databases for a particular client and time, regardless of whether those databases are GLR-compatible or not. With reference to FIG. 7c, some databases may have more than one version, and a UI 711 may be provided that enables a user to select a particular version for restoration. Moreover, and as indicated in the dialog 713 of FIG. 7d, some embodiments provide that only one database can be selected for restoration at a time.

With continued reference now to FIG. 7, once the user has selected a database for restoration, a user can initiate 710 the recovery process, such as by clicking or selecting a 'Recovery' button on a toolbar (not shown). UI 715 such as shown in FIG. 7e may be displayed 712 after, notifying the user that if the user should choose to proceed with the recovery process, any existing RDB will be deleted. If the user selects the 'No' option in UI 717, the user may choose to cancel 706 the recovery process.

On the other hand, if the user selects the 'Yes' option in UI 715, the user will be prompted with another UI, such as UI 717 in FIG. 7f, inquiring if the user wants to dismount the existing RDB. If the user selects the 'Yes' option in UI 717, any existing RDBs will be dismounted and the deleted (see FIG. 6, reference 622). As well, deletion of any un-mounted, existing RDB may occur automatically when triggered by selection 714 of the 'Yes' option in UI 715 by the user. Once the user has elected to continue with the recovery process, UI 717 closes and creation of an RDB begins automatically. An example process for creation of an RDB is disclosed in FIG. 6. As noted elsewhere herein, some or all of the process in FIG. 6 may be performed automatically without the need for UIs, or specific user inputs or commands.

After creation of the RDB, restoration 716 of the selected database to the RDB begins. It should be noted that creation of the RDB may take place at any time prior to 716. Alternatively, creation of the RDB can be performed in conjunction with 716. In any case, a query 718 is made as to whether or not the selected database was successfully recovered to the RDB. If not, the NWFS and RDB may be automatically deleted 720, and a corresponding error message, such as message 719 in FIG. 7g, communicated 722 to the user. At this point, the process 700 may return to 708.

Figure 7I:
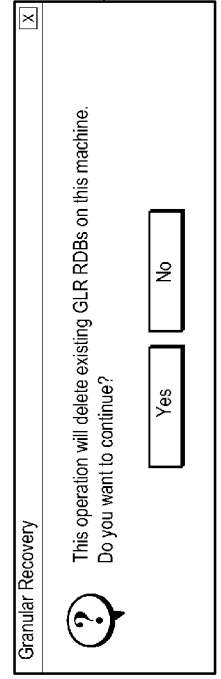

If, on the other hand, the query 718 reveals that recovery of the selected database to the RDB was successful, a UI such as the UI 721 of FIG. 7h is displayed which enables the user to review and select 724 one or more objects from the recovered database for restoration. If the user indicates that those objects are to be restored to the RDB that was created, a UI 723 such as is shown in FIG. 7i will be displayed, prompting the user to confirm that restoration of those objects to the new RDB will cause any existing RDBs to be deleted, automatically in at least some embodiments. In particular, after the user has closed 726 the UI 723, such as by selecting the 'Yes' option, any previously existing RDBs are deleted 728, and the NMM UI closed, ending process 700.

G. Example User Cases

It will be appreciated that various circumstances may occur in connection with the recovery and restoration processes disclosed herein. With reference now to FIGS. 8a to 8f, various examples of such circumstances are addressed.

G.1 User Exits NMM

A first user case involves the exit of a user from NMM. As noted elsewhere herein, at least some embodiments are configured so that all existing GLR resources will be deleted when NMM is exited. Such GLR resources may include, for example, one or more of an RDB, RSG, and NWFS volume.

G.2 User Changes Network Server

Figure 8A:
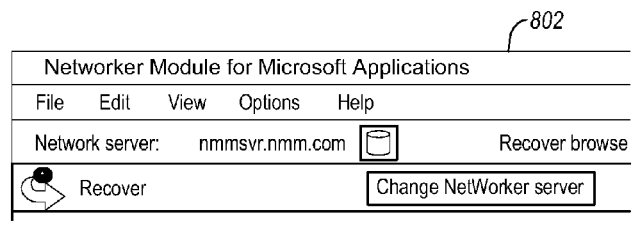
FIGS. 8a-8f are example dialog boxes and UIs that may be presented to a user in various circumstances that may occur in connection with the recovery and restoration processes disclosed herein.
Figure 8B:
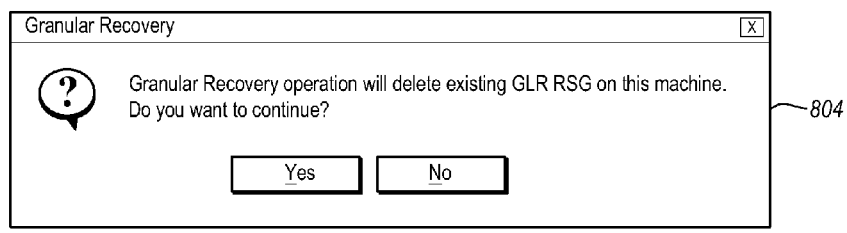
Figure 8C:
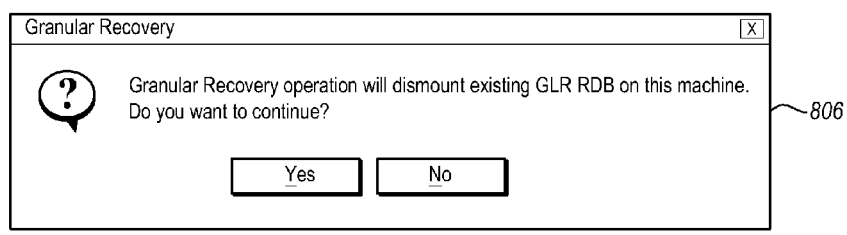

Directing attention now to FIGS. 8a-8c, a case where a user decides to change the network server is addressed. A user may use the NMM UI 802 shown in FIG. 8a to change the current network server, such as server 208 (FIG. 2), for example. However, because NWFS maps the virtual NWFS volume to the current server, a change to the network server requires disconnection of NWFS from the current network server and re-connection of NWFS to the new network server.

Depending upon whether MS Exchange 2007 or MS Exchange 2010 is running on the email server, a different UI may be presented to a user who decides to change network servers. In particular, the UI 804 will be presented to a user operating in the MS Exchange 2007 environment, and the UI 806 will be presented to a user operating in the MS Exchange 2010 environment. In either UI, if the user selects 'No,' no network server changeover will occur.

In connection with a server change, should the user decide to proceed, any GLR resources existing at the time of changeover must be deleted. In at least some embodiments, deletion of some or all of such GLR resources may occur automatically at a particular time, or upon the occurrence of a particular event. Such events may include disconnection of the current network server, or re-connection to a new network server.

G.3 User Changes Client

In general, at least some embodiments of the invention are configured and implemented so that a user can perform a GLR with respect to a storage group or database residing somewhere other than on the Exchange server that is running the NMM client. To illustrate, a user using the NMM Application on Exchange server 'A' (not shown) will be able to browse the GLR compatible storage group/database backups on Exchange server 'B' and perform a granular recovery for a selected backup that reside on Exchange server 'B.' The selected storage group/database will be recovered to a GLR recovery storage group/database on Exchange server 'A.'

G.4 NMM Application Crashes

In the event that the NMM application should crash for any reason, any remaining GLR resources, including NMM managed RSG/RDB will be deleted upon re-start of NMM. As disclosed elsewhere herein, such deletion may be performed by the Exchange 2010 or Exchange 2007 plug-in, as applicable.

G.5 NWFS Service Goes Down

In the event that the NMM application should crash for any reason, any remaining GLR, including NMM managed RSG/RDB resources will be deleted upon re-start of NMM. As disclosed elsewhere herein, such deletion may be performed by the Exchange 2010 or Exchange 2007 plug-in, as applicable.

In the event that the NWFS service goes down for some reason, the user will be prompted that the GLR recovery storage group or recovery database is lost. As well, the Exchange 2007 plug-in or the Exchange 2010 plug-in, as applicable, releases all GLR resources. Appropriate messages concerning the crash and associated cause(s) are logged into a log file, such as log file nmm.raw, and also in an application event log.

G.6 User Changes Plug-In

Figure 8D:
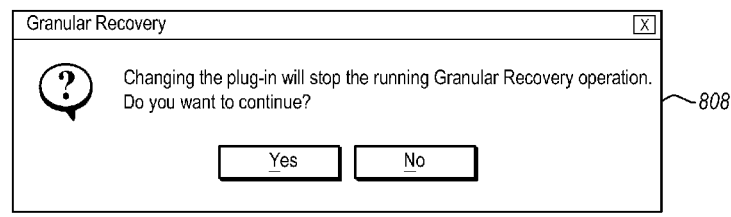
Figure 8E:
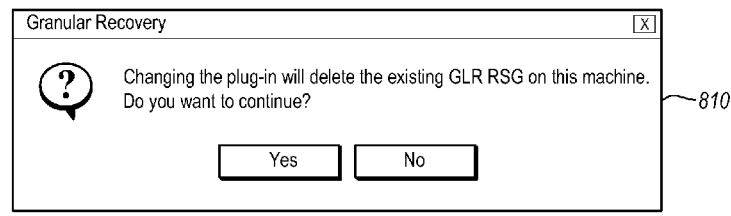
Figure 8F:
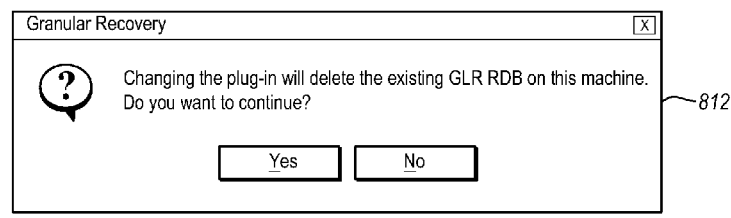

Directing attention now to FIGS. 8d-8f, a case where a user decides to change a plug-in is addressed. If desired, a user may change from one of the Exchange plug-ins, namely, Exchange 2007 plug-in or Exchange 2010 plug-in, to the Hyper-V plug-in or something else. However, if the user changes the plug-in, the GLR resources including NMM managed RSG/RDB will be released. The user may change the plug-in while the granular recovery operation is still running, or after the GLR has concluded. In the event that the user chooses to change the plug-in during the GLR, the user will be presented with UI 808 shown in FIG. 8d. If the user changes the plug-in when the GLR is not running, the user will be presented with either UI 810 (Exchange 2007), or UI 812 (Exchange 2010).

G.7 GLR in DAG and Exchange 2007 Cluster ENV.

Granular recovery is supported on both DAG and Exchange 2007 cluster environments. On a DAG node, GLR recovery can be performed on active databases. In Exchange 2007 CCR setup however, granular recovery cannot be performed from a passive node.

G.8 Recovering from Incremental Backup

All Exchange full backups will be GLR compatible in NMM2.4 by default. In some instances at least, incremental backups may require a somewhat different approach. To illustrate one example embodiment, if a user performs a full backup on Day1, an incremental on Day2 and another full backup on Day3 on an NWFS compatible device, the Day1 and Day3 backups are supported for granular recovery, but the backup from Day2 may not be usable for GLR. Instead, to recover using Day2 backup, the user can perform a normal RSG or RDB restore. It should be noted that GLR enabled backups may have some performance degradation.

H. Computing Devices and Media

The embodiments described herein may include the use of a special purpose or general-purpose computer including various computer hardware or software modules, as discussed in greater detail below. Among other things, any of such computers may include a processor and/or other components that are programmed and operable to execute, and/or cause the execution of, various instructions, such as the computer-executable instructions discussed below.

Embodiments within the scope of the present invention also include computer-readable media for carrying or having computer-executable instructions or data structures stored thereon. Such computer-readable media can be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium which can be used to carry or store desired program code means in the form of computer-executable instructions or data structures and which can be accessed by a general purpose or special purpose computer. When information is transferred or provided over a network or another communications connection (either hardwired, wireless, or a combination of hardwired and wireless) to a computer, the computer properly views the connection as a computer-readable medium. Thus, any such connection is properly termed a computer-readable medium. Combinations of the above should also be included within the scope of computer-readable media.

Computer-executable instructions comprise, for example, instructions and data which cause a general purpose computer, special purpose computer, or special purpose processing device to perform a certain function or group of functions. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

As used herein, the term "module" or "component" can refer to software objects or routines that execute on the computing system. The different components, modules, engines, and services described herein may be implemented as objects or processes that execute on the computing system, for example, as separate threads.

While the system and methods described herein are preferably implemented in software, implementations in hardware or a combination of software and hardware are also possible and contemplated. In this description, a "computing entity" may be any computing system as previously defined herein, or any module or combination of modulates running on a computing system.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A process for recovery management in a server environment, the process comprising:
   dismounting an existing database from an existing volume on the server in response to an initiation of a recovery;
   deleting the dismounted database;
   deleting the existing volume,
   creating a new volume on the server;
   creating a new database on the server, the new database configured to receive a backup;
   mounting the new database to the new volume;
   setting an overwrite flag for the new database; and
   restoring the backup to the new database, and recovering a least one object from the restored backup;
   wherein, in response to initiation of the recovery, each of the following processes is performed without requiring a specific user command or input to initiate that particular process: creating the new volume; creating the new database; mounting the new database; setting the overwrite flag; deleting the dismounted database; deleting the existing volume; and restoring the backup to the new database.

2. The process as recited in claim 1, wherein:
   the new database created on the server is one of a recovery storage group (RSG) and a recovery database (RDB); and
   the existing database is one of a recovery storage group (RSG) and a recovery database (RDB).

3. The process as recited in claim 1, wherein the process comprises part of a recovery process.

4. The process as recited in claim 3, wherein the recovery process is a granular level recovery (GLR) process.

5. The process as recited in claim 1, wherein the backup is a user-browsable backup that enables a user to browse the backup and recover a selected object from the backup.

6. The process as recited in claim 1, wherein the backup is received from a network server.

7. The process as recited in claim 1, wherein the new volume is a virtual volume.

8. The process as recited in claim 1, wherein the server is an email server.

9. A plug-in having instructions that are carried on a non-transitory storage medium and which, when executed by a processor of the server, perform the process recited in claim 1, wherein the plug-in is an email program plug-in.

10. The process as recited in claim 1, wherein creation of the backup predates the existence of the new database.

11. A server-based data recovery process, the data recovery process comprising:
   dismounting any previously existing RSG or RDB database from a volume on the server in response to initiation of a recovery;
   deleting the dismounted database;
   deleting the volume to which the dismounted database was previously mounted;
   creating a new database;
   mounting the new database to a new volume on the server, where the new database is configured to receive a backup of the server, and the new database is one of an RSG or RDB database;
   setting an overwrite flag for the new database; and
   restoring the backup of the server into the new database,
   wherein, in response to initiation of the recovery, each of the following processes is performed automatically without requiring a specific user command or input to initiate that particular process: creating the new database; mounting the new database; setting an overwrite flag; and deleting the dismounted database;
   presenting a list of recoverable objects present in the restored backup;
   receiving an indication to recover one of the recoverable objects;
   recovering one of the recoverable objects from the restored backup; and
   copying the recovered object to a destination.

12. The server-based recovery process as recited in claim 11, wherein the server-based recovery process is a GLR process.

13. The server-based recovery process as recited in claim 11, wherein the indication is received by way of a UI.

14. The server-based recovery process as recited in claim 11, wherein the recovered object comprises one of an email message, an email folder, a calendar, a contact, and a note.

15. The server-based recovery process as recited in claim 11, wherein the destination comprises an email mailbox.

16. The server-based recovery process as recited in claim 11, wherein the following processes are performed by a plug-in to an email client that is resident on the server: creating the database; mounting the database; setting an overwrite flag; dismounting a previously existing RSG or RDB database; and deleting the previously existing database.

17. A server, comprising:
   a hardware processor; and
   non-transitory computer-readable media including instructions that, when executed, cause the hardware processor to perform the following:
   dismounting an existing database from an existing volume on the server in response to initiation of a recovery;
   deleting the dismounted database;
   deleting the existing volume,
   creating a new volume on the server;
   creating a new database on the server, the new database configured to receive a backup;
   mounting the new database to the new volume;
   setting an overwrite flag for the new database; and
   restoring the backup to the new database, and recovering at least one object from the restored backup;
   wherein, in response to initiation of the recovery, each of a plurality of the following processes is performed automatically without requiring a specific user command or input to initiate that particular process of the plurality of processes, and another of the following processes is initiated by a user: creating the new volume; creating the new database; mounting the new database; setting the overwrite flag; deleting the dismounted database; deleting the existing volume; and restoring the backup to the new database.

18. The server as recited in claim 17, wherein the server is an email server.

19. The server as recited in claim 17, wherein the volume is a virtual volume.

20. The server as recited in claim 17, wherein the process that is performed automatically without initiation by a user is performed without interaction between the user and a UI.

21. The server as recited in claim 17, wherein creation of the backup predates the existence of the new database.

* * * * *